United States Patent Office 3,624,985
Patented Dec. 7, 1971

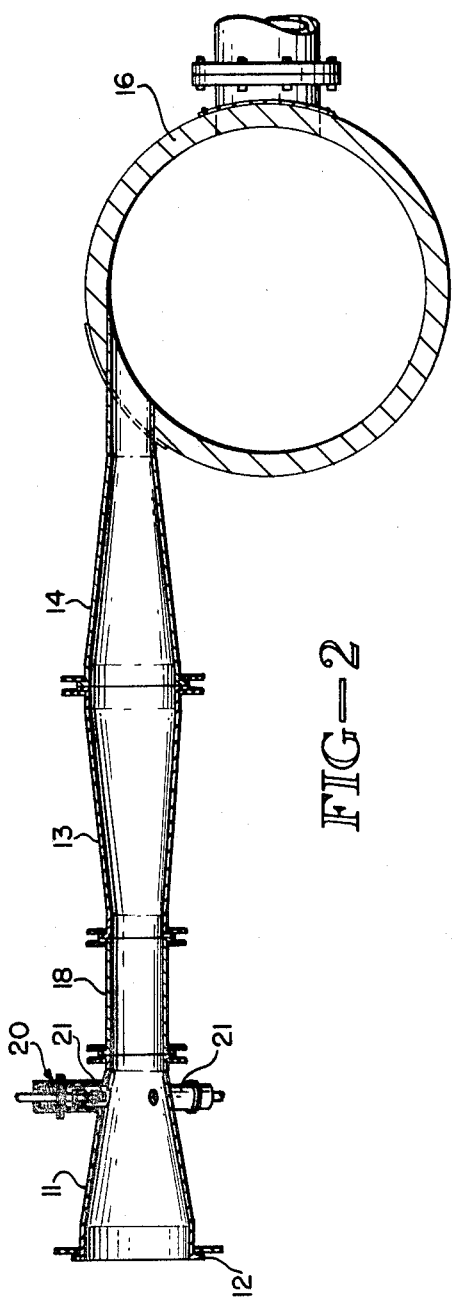
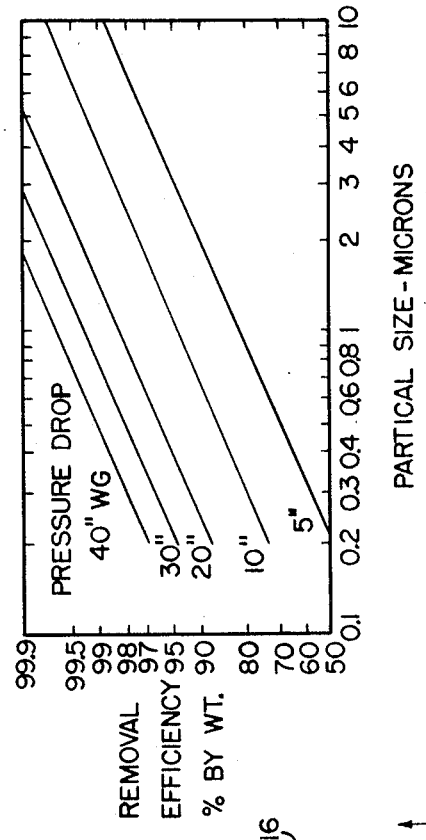
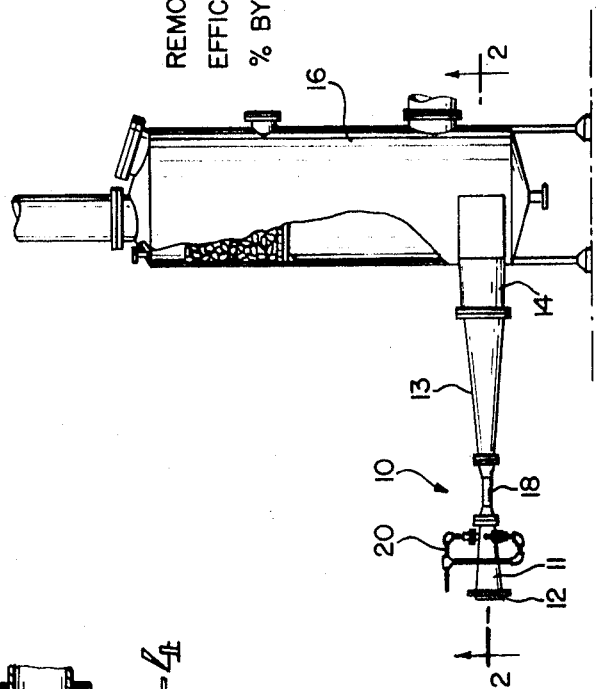
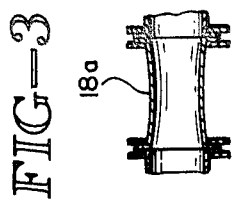
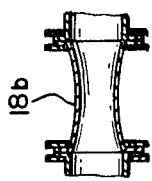

3,624,985
METHOD OF REMOVING POLLUTANTS FROM INDUSTRIAL EXHAUST PRODUCTS
Roger F. Giles, Portland, Oreg., assignor to Simpson Timber Company, Seattle, Wash.
Filed Oct. 15, 1969, Ser. No. 866,468
Int. Cl. B01d 47/10
U.S. Cl. 55—85
3 Claims

ABSTRACT OF THE DISCLOSURE

A method of pollutant removal employs the step of accelerating the particles through a scrubbing liquid in a venturi scrubber and selectively changing the acceleration by changing the removable throat section according to the size of the particles in the industrial exhaust products being treated.

BACKGROUND OF THE INVENTION

Field of the invention

This invention pertains to pollution removal and, more particularly, to venturi scrubbing systems.

DESCRIPTION OF THE PRIOR ART

A major disadvantage of venturi scrubbing systems heretofore known is that the systems operate efficiently only on a range of pollutant constituents which were present in the industrial exhaust products at the time the system was designed. As a result whenever a major change in the constituency of the polluted exhaust products took place, particularly a change in particle size, the system would operate inefficiently either by introducing an unnecessary pressure drop in the discharge or by removing insufficient quantities of the particles.

SUMMARY OF THE INVENTION

It is a primary object of this invention to provide a venturi scrubbing system that may be adjusted or tuned to operate at peak efficiency and with the lowest possible pressure drop in the discharge line regardless of the size of the particles in the industrial exhaust products being treated. Basically the invention employs a venturi scrubbing system having a replaceable throat section for which one of several alternate throat sections of varying diameters may be substituted quickly and inexpensively.

It is another object of this invention to provide a method of removing particles from industrial exhaust products in which the particles are accelerated, impinged with a scrubbing liquid, and decelerated and wherein the acceleration step may be varied depending upon the size of the particles.

BRIEF DESCRIPTION OF THE DRAWINGS

FIG. 1 is a schematic elevation of the venturi scrubbing system embodying the principles of the invention.

FIG. 2 is a horizontal section taken along the line 2—2 of FIG. 1.

FIG. 3 is a fragmentary axial section illustrating an alternative throat section used in the system of FIG. 1.

FIG. 4 is a fragmentary axial section showing another alternative throat section used in the system of FIG. 1.

FIG. 5 is a diagram illustrating the optimum pressure drop required for various size particles.

DESCRIPTION OF THE PREFERRED EMBODIMENTS

In general, the venturi scrubbing system employs a venturi 10 having an inlet duct 11 axially converging in the direction of flow and connected at its upstream end 12 to a furnace or the like which produces polluted industrial exhaust products. The venturi also includes an outlet duct 13 axially diverging in the direction of flow and connected at its downstream end 14 to a cyclone separator 16. As the industrial exhaust products pass through the venturi they are accelerated through a throat section 18 connected between the inlet and outlet ducts. The accelerated products are scrubbed by a liquid, usually water, injected perpendicularly to the direction of flow by an injection manifold 20 having nozzles 21. The high turbulence and large difference in velocity between the liquid and the exhaust products cause impaction of the liquid droplets and solid particle constituents of the exhaust products. This scrubbing action, as is well known, results in collection of the particles and absorption of soluble gases.

After passing through the venturi throat section 18, the exhaust products gradually expand so that much of the initial pressure drop lost during the acceleration through the throat of the venturi is recovered; however, much of the pressure drop remains unrecovered. The mixture of liquid and gas products then passes into the cyclone separator 16 that removes the pollutant-loaded liquid droplets.

As is best illustrated in FIG. 5 the pressure drop required in a typical system to remove particles decreases for the same removal efficiency as the particle size increases. It is thus apparent that the venturi throat section 18, which produces a single pressure drop for a particular installation regardless of the particle size of the constituents making up the industrial exhaust products, often uses a pressure drop that is greater than is necessary or a pressure drop that does not remove the required quantity of particles.

In order to minimize the pressure drop as particle size increases either at the same installation or for new installations venturi throat sections having larger diameters are employed. One technique is to initially begin with a large diameter throat section designed, for example, for particles averaging 8 microns and as the particles decrease in size during subsequent operations of the furnace or the like replace the removable throat section 18 with an alternative throat section of smaller diameter such as the throat section 18a shown in FIG. 3 or an even smaller diameter throat section such as the section 18b shown in FIG. 4. It is important to note that in all of the throat sections the angle of divergence of the throats relative to the direction of flow of the industrial exhaust products must not exceed the angle of divergence of the outlet duct 13.

In the method of removing pollutants from industrial exhaust products the products are accelerated as they are discharged along a path, then a liquid is impinged against the products as they are accelerated and finally the products are decelerated. The unique feature is then to change the acceleration to correspond to the size of the particles in the industrial exhaust products that are being removed.

As is apparent the replaceable throat section and varying acceleration steps permit a relatively unskilled workman to "tune" a venturi scrubbing system to obtain maximum removal efficiency while maintaining minimum pressure drop in the system. In addition, the tuning may be accomplished with a minimum of shut-down time and at a very small expense since only a small portion of the entire system need be replaced.

While the preferred forms of the invention have been illustrated and described the details are capable of modification by one skilled in the art. Accordingly, no limitations are to be implied and the scope of the invention is to be construed solely by the broadest interpretation of the appended claims that they admit.

The embodiments of the invention in which an exclusive property or privilege is claimed are defined as follows:

1. A method of removing pollutants from industrial exhaust products having particulate constituents comprising discharging the products along a path, accelerating the products at a section in the path and as a result obtaining a predetermined pressure drop in said path;

impinging the products with a scrubbing liquid at said accelerating section, decelerating the products downstream of said accelerating section; and changing the acceleration at said accelerating section to obtain a different pressure drop dependent upon the size of the particulate constituents.

2. The method of claim 1 further including the step of separating the moisture laden particulate constituents after said decelerating step.

3. A method of removing pollutants from industrial exhaust products having particulate constituents comprising discharging the products along a path, accelerating the products at a removable throat section in the path and as a result obtaining a predetermined pressure drop in said path;

impinging the products with a scrubbing liquid at said accelerating throat section, decelerating the products downstream of said accelerating section; and changing the acceleration at said accelerating section by substituting a throat section producing a different acceleration to obtain a different pressure drop dependent upon the size of the partiulate constituents.

References Cited

UNITED STATES PATENTS

| | | | |
|---|---|---|---|
| 2,887,390 | 5/1959 | Coulter et al. | 99—199 |
| 3,396,514 | 8/1968 | Hurst et al. | 55—85 X |
| 3,502,308 | 3/1970 | Keyosi Simizu | 261—64 |

FOREIGN PATENTS

| | | | |
|---|---|---|---|
| 1,001,436 | 8/1965 | Great Britain | 261—V.S |

REUBEN FRIEDMAN, Primary Examiner

R. W. BURKS, Assistant Examiner

U.S. Cl. X.R.

55—257; 261—118